(12) United States Patent
Santos et al.

(10) Patent No.: US 7,252,511 B2
(45) Date of Patent: *Aug. 7, 2007

(54) DEVICES AND METHODS FOR CONTROLLING RELATIVE MOVEMENT BETWEEN LAYERS OF AN ELECTRONIC DEVICE

(75) Inventors: Theodore R. Santos, Boulder, CO (US); Andrew G. Lejman, Lafayette, CO (US); David Larson, Boulder, CO (US); Jeffrey Swanson, Erie, CO (US)

(73) Assignee: QUALCOMM Incorporated, San Diego, CA (US)

( * ) Notice: Subject to any disclaimer, the term of this patent is extended or adjusted under 35 U.S.C. 154(b) by 248 days.

This patent is subject to a terminal disclaimer.

(21) Appl. No.: 10/945,577

(22) Filed: Sep. 20, 2004

(65) Prior Publication Data

US 2006/0061552 A1    Mar. 23, 2006

(51) Int. Cl.
*H01R 39/00*  (2006.01)
*G06F 1/16*  (2006.01)
*H04B 1/38*  (2006.01)

(52) U.S. Cl. .................... 439/10; 361/686; 455/566

(58) Field of Classification Search ............... 439/10, 439/31, 165; 361/490, 679–687, 695, 724–727; 257/207, 697; 345/164, 905; 455/145, 186, 455/566

See application file for complete search history.

(56) References Cited

U.S. PATENT DOCUMENTS 6,149,442 A * 11/2000 Enright ..................... 439/31

2005/0104856 A1 * 5/2005 Jacobs et al. ............... 345/169
2005/0104857 A1 * 5/2005 Jacobs et al. ............... 345/169
2006/0061943 A1 * 3/2006 Santos et al. ............... 361/679
2006/0063569 A1 * 3/2006 Jacobs et al. ............ 455/575.1

FOREIGN PATENT DOCUMENTS

DE    203 17 865 U1    4/2004
EP    0 618 715 A1     10/1994
EP    0 927 924 A1     7/1999

* cited by examiner

*Primary Examiner*—Chandrika Prasad
(74) *Attorney, Agent, or Firm*—Thomas R. Rouse; Charles D. Brown; Adbollah Katbab (57) ABSTRACT

The disclosed embodiments provide devices and methods for movably connecting module layers of an electronic device to actuate one operational mode while limiting actuation of other modes. In one embodiment, an electronic device includes a first module layer movable in a first direction and a second module layer movably connected relative to the first module layer. Further, a third module layer is movably connected relative to the second module layer and movable in a second direction. Additionally, a limiting member is movably positioned relative to the module layers to be engageable with the third module layer to prevent movement in the second direction during movement of the first module layer in the first direction, or to be engageable with the first module layer to prevent movement in the first direction during movement of the third module layer in the second direction.

66 Claims, 7 Drawing Sheets

DEVICES AND METHODS FOR CONTROLLING RELATIVE MOVEMENT BETWEEN LAYERS OF AN ELECTRONIC DEVICE

CROSS-REFERENCE TO RELATED APPLICATIONS

This application is related to the following U.S. patent applications, each assigned to the present assignee and each hereby incorporated by reference:

Application Ser. No. 10/718,125, entitled "A Portable Device With Versatile Keyboard," filed Nov. 19, 2003; and Application Ser. No. 10/945,576, filed concurrently herewith, entitled "Devices And Methods For Controlling Relative Movement Between Layers Of An Electronic Device."

BACKGROUND

The disclosed embodiments relate to portable electronic devices, and more particularly, to devices and methods for controlling relative movement between layers of an electronic device.

Portable electronic devices such as mobile phones, pagers, handheld computers, personal digital assistants ("PDA's") and hand-held gaming devices are becoming increasingly popular for both business and personal use. One advantage of these devices is their portability due to their small size, light weight, battery-powered or cordless operation and, in some cases, their wireless communications ability. These features allow these portable electronic devices to be utilized whenever and wherever a user desires.

Because of the increasing popularity of these devices, however, it is not uncommon for a single user to carry with them more than one of these devices at one time. For example, a user may have a mobile phone and two-way pager strapped to their belt, while carrying a PDA in a pocket and a gaming device in their bag. As such, having separate devices perform each service or function creates a problem for a user who requires more than one or two services/functions offered by these portable devices.

Designers have realized this problem of device proliferation, and resultingly have tried to combine a number of services or functionalities into a single device. In this manner, a user may only require a single device having a number of operational modes that correspond to a number of the desired services or functions. One drawback of incorporating many operational modes into a single device, however, is that each service or function typically has an established configuration, including the overall shape and the number and specific types of components. For example, a mobile phone generally includes a phone keypad consisting of 12 keys: 1 key each for the numbers 0-9, and a separate key for the "*" and "#" characters. Further, a mobile phone is generally oriented for use with its length extending in a vertical axis such that its display unit is positioned above the keypad and such that the alphanumeric or graphical output of the display can be read by a user in this orientation. In contrast, a two-way pager typically includes an alphanumeric keyboard, such as a QWERTY keyboard that may include twice as many keys as a phone keypad. Further, a two-way pager typically has a display with a width greater than a length as viewed during use. In attempting to combine services/functionalities, a designer needs surface area onto which these established orientations and sets of components may be mounted. This increased demand for surface area competes with an overall goal of maintaining a device having a compact and portable size.

The copending patent application Ser. No. 10/718,125, entitled "A Portable Device With Versatile Keyboard," filed Nov. 19, 2003, addresses the problem of combining several configurations by creating a device having a number of functional layers. In such a device, each layer may have a first or neutral position in which it overlaps with the other layers to form a compact electronic device. Additionally, each layer may have a second position where a specific functionality associated with that layer is actuated, thereby creating additional operational modes.

One issue with such portable devices having multiple layers of functional components is that it may be possible to actuate more than one layer at one time. The resulting actuation of more than one operational mode may cause confusion for the user, and may create operational problems within the electronic device.

Thus, portable electronic devices having multiple layers of functional components are desired which provide for a discrete actuation between predetermined operational modes.

BRIEF SUMMARY

In accordance with one aspect, the disclosed embodiments provide a system and method for controlling relative movement between layers of an electronic device.

In one embodiment, an electronic device comprises a first component layer movable in a first direction, a second component layer movably connected relative to the first component layer, and a third component layer movably connected relative to the second component layer and movable in a second direction. The electronic device further includes a limiting member movable at least between a first position and a second position, the limiting member engageable with the second component layer and the third component layer in the first position to prevent relative movement in the second direction during movement of the first component layer in the first direction.

In another embodiment, an electronic device, comprises a first component layer movable in a first direction and having a first limiting member, a second component layer movably connected relative to the first component layer, and a third component layer movably connected relative to the second component layer and movable in a second direction. The electronic device further includes a second limiting member movably connected to the second component layer and having a first displacement surface at a first end. The second limiting member is movable between a first position and a second position, wherein the first limiting member is contactable with the first displacement surface during at least a portion of a movement of the first component layer in the first direction to move the second limiting member into the first position. Further, the second limiting member is engageable with the third component layer to substantially prevent relative movement in the second direction.

In yet another embodiment, an electronic device comprises a first component layer movable in a first direction, a second component layer movably connected relative to the first component layer, and a third component layer movably connected relative to the second component layer and movable in a second direction. The electronic device further includes a movably connected means for substantially preventing relative movement between at least one of the second component layer and the third component layer during movement of the first component layer in the first direction and the second component layer and the first component layer in the second direction during movement of the third component layer in the second direction.

In a further embodiment, a method of controlling relative movement between movable layers of an electronic device comprises movably connecting a first module layer to a second module layer having a first functional component such that a relative movement of the first module layer in a first direction exposes the first functional component. The method further includes movably connecting the second module layer to a third module layer having a second functional component such that a relative movement of the third module layer in a second direction exposes the second functional component. Additionally, the method includes movably positioning a first limiting member to prevent movement of the third module layer in the second direction during movement of the first module layer in the first direction.

In an additional embodiment, a method for controlling actuation of operational modes of an electronic device comprises a step for exposing a first set of functional components on a second module layer movably connected to a first module layer, where the first set of functional components is associated with a first operational mode of the electronic device. The method also includes a step for exposing a second set of functional components on a third module layer movably connected to the second module layer, where the second set of functional components is associated with a second operational mode of the electronic device. And, the method further includes a step for movably positioning a limiting member to prevent exposure of one of the first set of functional components and the second set of functional components during exposure of the other one of the first set of functional components and the second set of functional components.

Additional aspects and advantages of the disclosed embodiments are set forth in part in the description which follows, and in part are obvious from the description, or may be learned by practice of the disclosed embodiments. The aspects and advantages of the disclosed embodiments may also be realized and attained by the means of the instrumentalities and combinations particularly pointed out in the appended claims.

BRIEF DESCRIPTION OF THE DRAWINGS

The disclosed embodiments will hereinafter be described in conjunction with the appended drawings provided to illustrate and not to limit the disclosed embodiments, wherein like designations denote like elements, and in which.

DETAILED DESCRIPTION

The disclosed embodiments include devices and methods for controlling relative movement between layers of an electronic device.

Referring to FIGS. 1-12, in one embodiment, a layer locking system 10 (FIGS. 1-9) controls relative movement of portions of electronic device 12, which has a number of movably interconnected module layers 14, 16, 18 that provide electronic device 12 with a number of functional capabilities. In one embodiment, for example referring to FIGS. 1-3 and 10, electronic device 12 may have a first operational mode, such as a gaming mode, when module layers 14, 16, 18 are positioned in a first or neutral position where a first set of components 20 (FIG. 10) such as a display unit 22 and directional keypads 24, 26 on the exterior of electronic device 12 may be utilized. Referring to FIGS. 4-6 and 11, electronic device 12 may have a second operational mode, such as a phone or audio communications mode, when first module layer 14 is moved in a first direction 28 relative to second and third module layers 16, 18 to expose a first additional set of components 30 (FIG. 11), such as a phone keypad 31 and microphone 32, on second module layer 16. Further, referring to FIGS. 7-9 and 12, electronic device 12 may have a third operational mode, such as a pager or text communications mode, when third module layer 18 is moved in a second direction 34 relative to first and second module layers 14, 16 to expose a second additional set of functional components 36 (FIG. 12), such as a QWERTY keyboard 38, on third module layer 18. Locking system 10 interacts with each module layer 14, 16, 18 to enable a discrete actuation of a single operational mode by limiting predetermined relative movements between module layers 14, 16, 18 during actuation. In other words, locking system 10 allows predetermined relative movement of module layers 14, 16, 18 in a direction associated with the selected operational mode while preventing relative movement in one or more other predetermined directions, thereby locking out the other operational modes. Thus, locking system 10 provides electronic device 12 with multiple, discrete operational modes while preventing problems associated with attempted actuation of more than one operational mode at a time.

Referring to FIGS. 1-9 and 13-16, locking system 10 may include at least one limiting member 40, 42, 44 associated with each module layer 14, 16, 18. Limiting members 40, 42, 44 may act in one or more combinations during actuation of a selected operational mode to allow certain relative movements between module layers 14, 16, 18 while preventing other relative movements. Referring specifically to FIGS. 9 and 14-16, each limiting member 40, 42, 44 may include one or more displacement surfaces 41, 43, 45, 47 (FIG. 9) associated with providing relative movement in at least a first predetermined direction between the respective limiting members. Suitable examples of displacement surfaces 41, 43, 45, 47 include one or a combination of linear, planar, pointed and curved surfaces, and any other surface capable of transferring a displacement force to or from a limiting member 40, 42, 44. Additionally, each limiting member 40, 42, 44 may include one or more locking surfaces 49, 51, 53 that substantially limit or prevent relative movement in one or more predetermined directions. As utilized here, the term "substantially limit or prevent" refers to minimizing relative movement in a given direction such that an operational mode associated with the relative movement in the given direction is not actuated. Suitable examples of locking surfaces 49, 51, 53 include linear, planar, pointed and curved surfaces, and other similar surfaces that resist or substantially prevent the transfer of a displacement force to or from a limiting member 40, 42, 44, and hence resist or substantially prevent displacement of a limiting member 40, 42, 44, in at least one predetermined direction. During predetermined relative movements between module layers 14, 16, 18, displacement surfaces 41, 47 engage corresponding displacement surfaces 43, 45 to move limiting member 42, causing one of locking surfaces 49 or 53 to engage the corresponding locking surface 51 and lock out other predetermined relative movements and thereby allow actuation of a single operational mode of electronic device 12.

Figure 1:
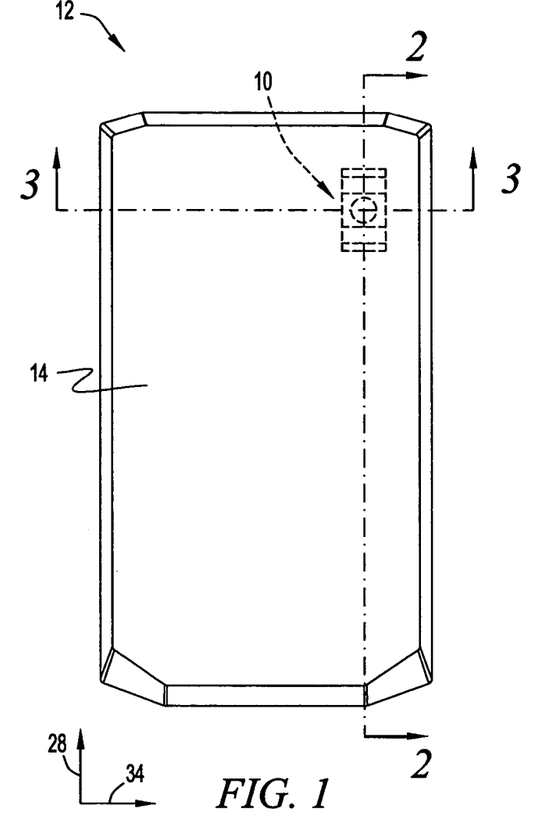
FIG. 1 is a top view of one embodiment of an electronic device, with some components removed for clarity, having a number of module layers oriented in a first or neutral operational mode, and including one embodiment of a layer locking mechanism.
Figure 2:
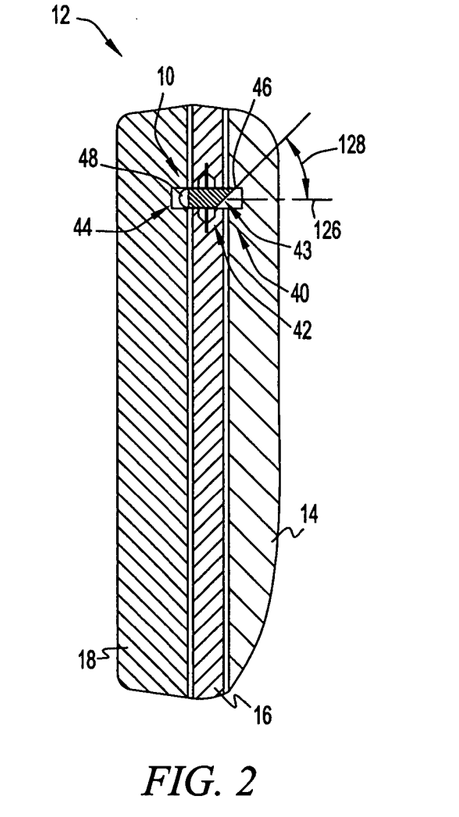
FIG. 2 is a cross-sectional view along line 2-2 in FIG. 1.
Figure 3:
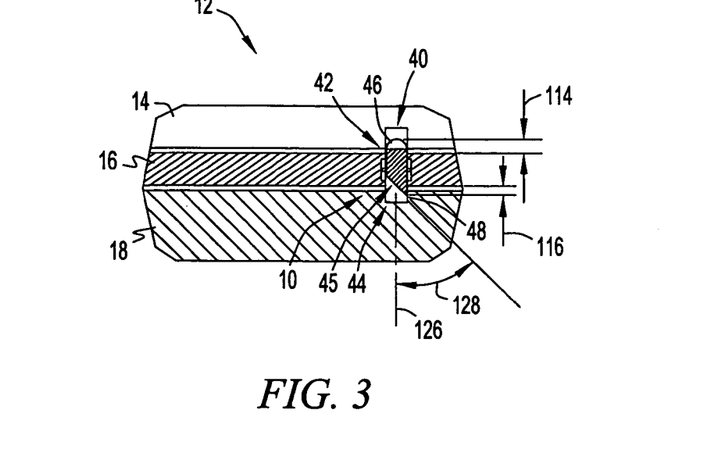
FIG. 3 is a cross-section view along line 3-3 in FIG. 2
Figure 4:
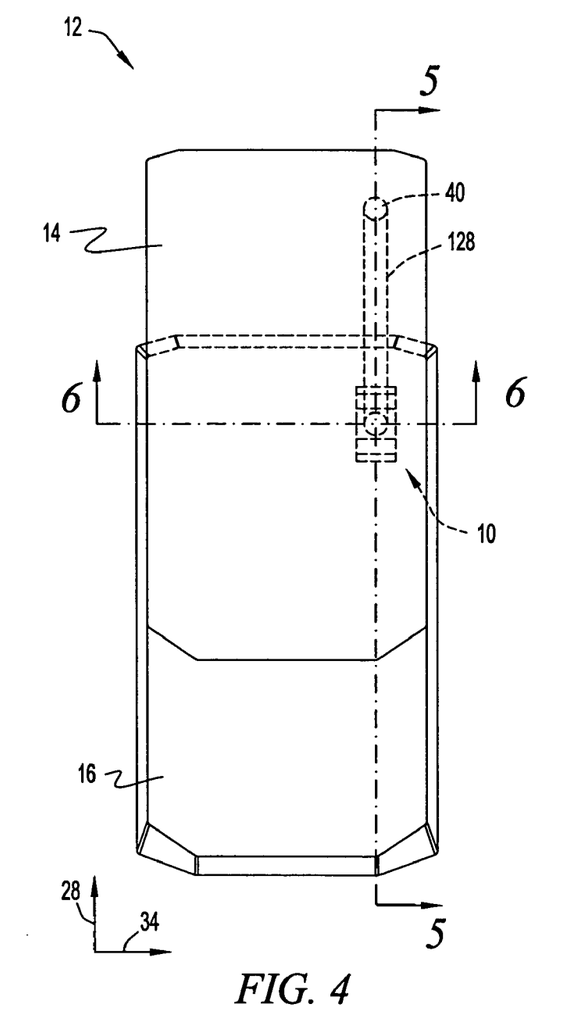
FIG. 4 is a top view of the electronic device and layer locking mechanism of FIG. 1 with the upper module layer moved in a first direction relative to the remaining module layers, thereby actuating a second operational mode.
Figure 5:
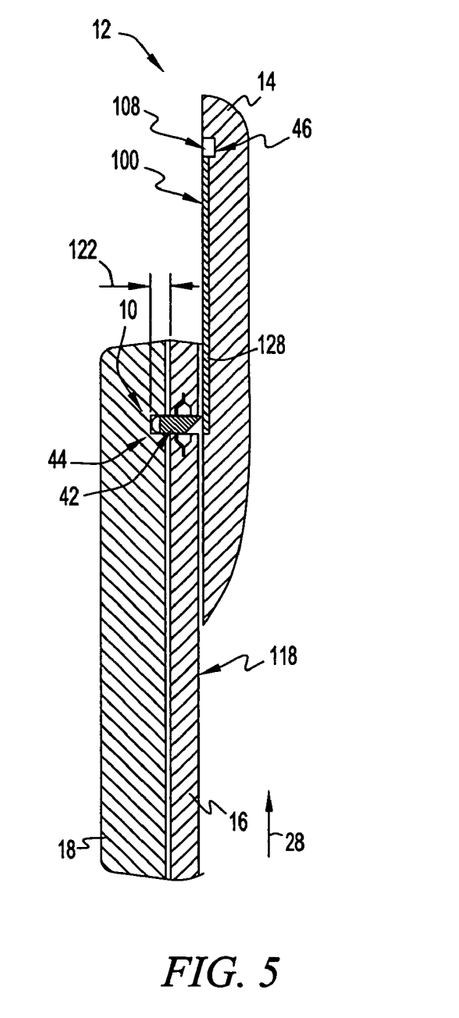
FIG. 5 is a cross-sectional view along line 5-5 in FIG. 4.
Figure 6:
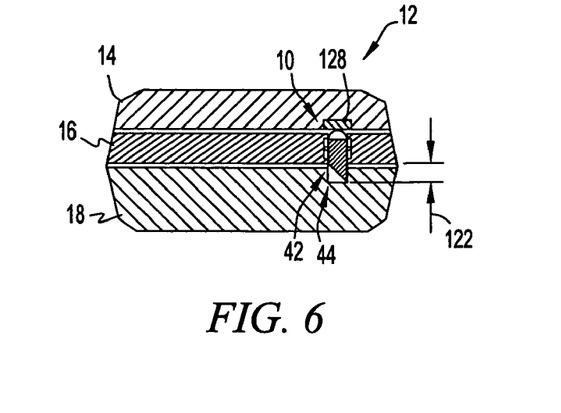
FIG. 6 is a cross-sectional view along line 6-6 in FIG. 4.
Figure 7:
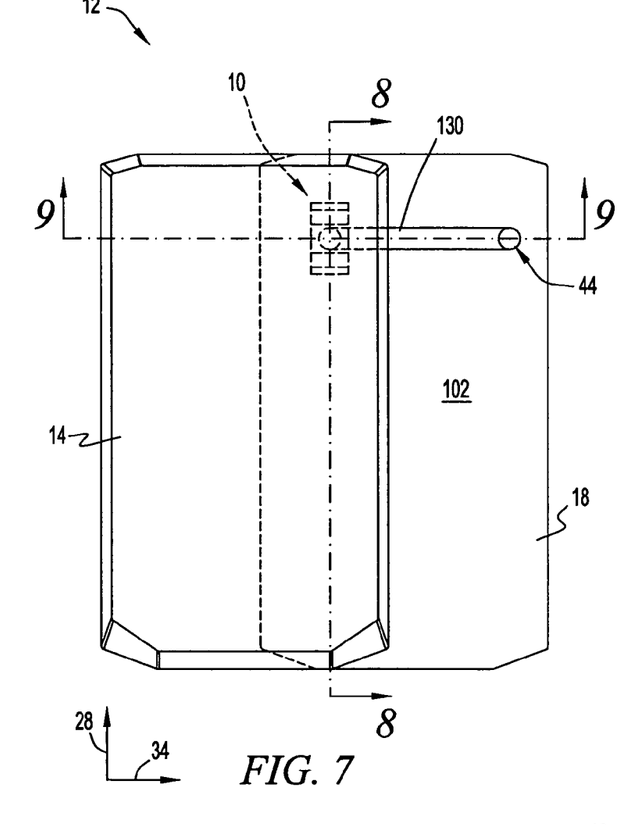
FIG. 7 is a top view of the electronic device and layer locking mechanism of FIG. 1 with the lower module layer moved in a second direction relative to the remaining module layers, thereby actuating a third operational mode.
Figure 8:
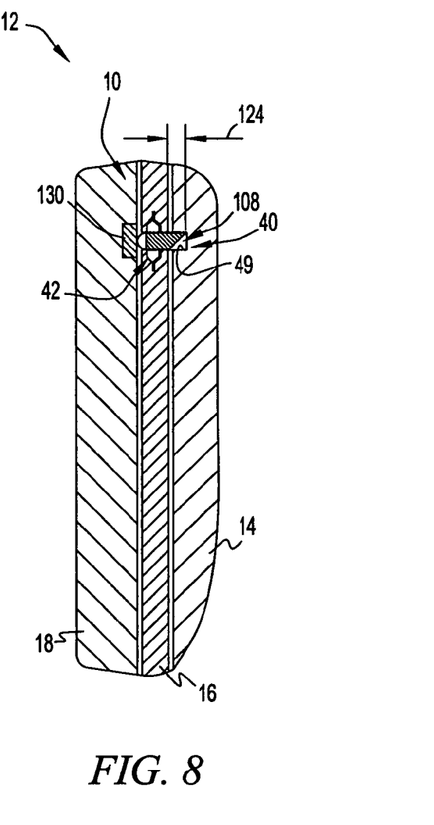
FIG. 8 is a cross-sectional view along line 8-8 in FIG. 7.
Figure 9:
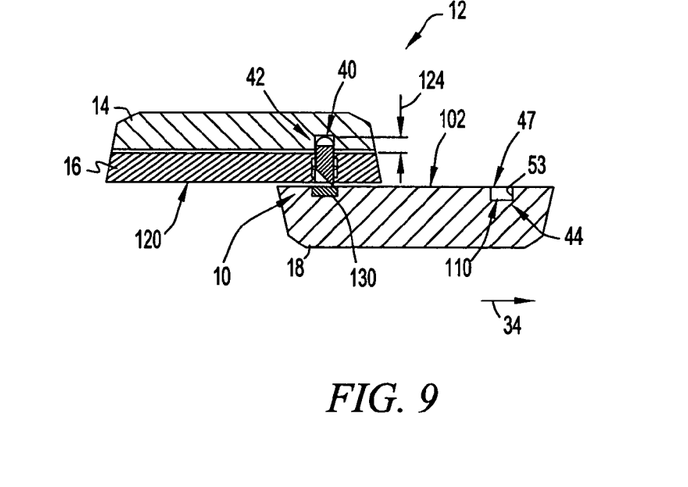
FIG. 9 is a cross-sectional view along line 9-9 in FIG. 7.
Figures 10, 11, 12, 13:
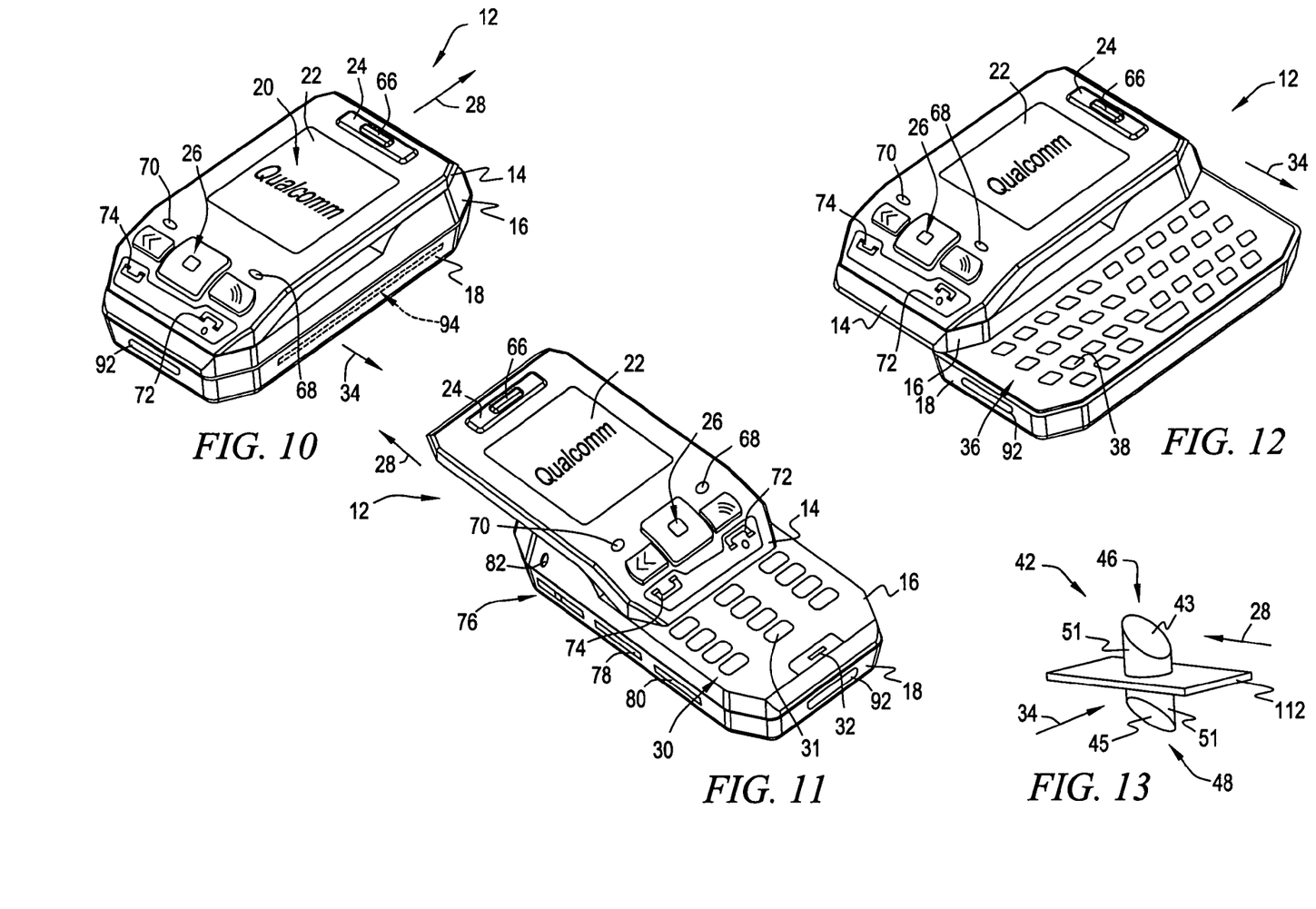
FIG. 10 is perspective view of the electronic device of FIG. 1 with a first set of exposed functional components corresponding to the first operation mode.
FIG. 11 is a perspective view of the electronic device of FIG. 4 with a second set of exposed functional components corresponding to the second operational mode.
FIG. 12 is a perspective view of the electronic device of FIG. 7 with a third set of exposed functional components corresponding to the third operational mode.
FIG. 13 is a perspective view of one embodiment of a layer locking mechanism, including a pin and biasing mechanism.
Figure 14:
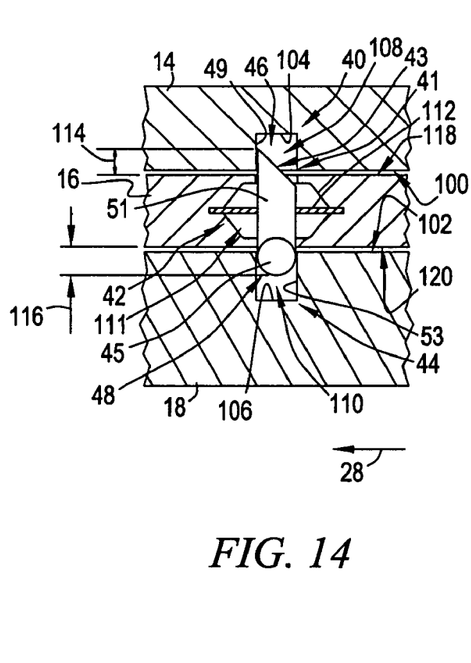
FIG. 14 is a partial sectional view of the module layers and limiting members in the first operational mode of the electronic device 12.
Figure 15:
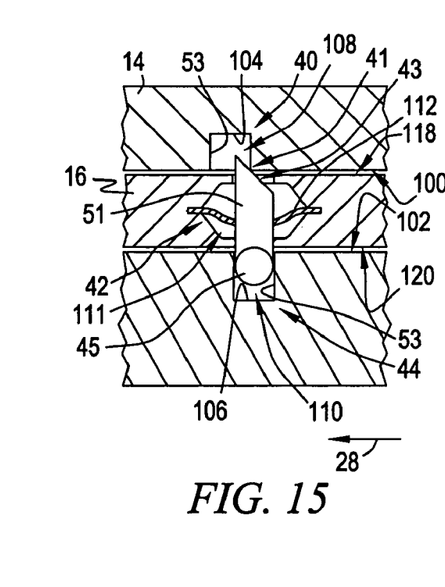
FIG. 15 is a partial sectional view similar to FIG. 14, but with the upper module layer having moved in the first direction such that the displacement surface of the upper limiting member contacts the displacement surface of the middle limiting member.
Figure 16:
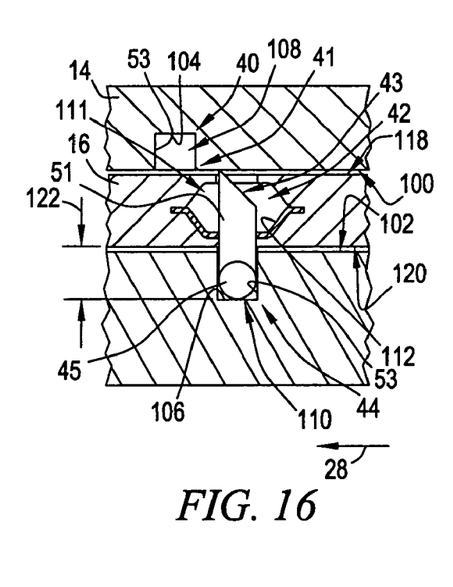
FIG. 16 is a partial sectional view similar to FIGS. 14 and 15, but with the upper limiting member having moved further in the first direction such that the locking surface of the middle limiting member is in a contactable position with respect to the locking surface of the lower limiting member to prevent movement of the lower module layer in the second direction.

In one embodiment, for example referring to FIGS. 14-16, limiting members 40, 44 are respectively positioned on the interior-facing surfaces 100 (also see FIG. 5), 102 (also see FIG. 9) of upper and lower module layers 14, 18 adjacent to limiting member 42 when electronic device 12 is in a first or neutral orientation. Limiting members 40, 44 respectively include a displacement surface 41, 47 connected to a locking surface 49, 53 that joins an end wall 104, 106 to define respective cavities 108, 110 in surfaces 100, 102. Cavities 108, 110 are sized to receive at least a portion of limiting member 42. In this embodiment, displacement surfaces 41, 47 are corners or points formed at the intersection of the respective interior-facing surfaces 100, 102 and the locking surfaces 49, 53. As discussed above, however, it should be noted that in alternate embodiments the displacement surfaces 41, 47 may take other forms, such as an angled or beveled portion of a side wall of a cavity, where such angling or beveling may provide for smoother contact with an adjacent limiting member during relative movements between module layers 14, 16, 18. Further, locking surfaces 49, 53 in this embodiment are substantially perpendicular to interior-facing surfaces 100, 102 and extend inward to define circular side walls of cavities 108, 110. Again, as discussed above, it should be noted that in alternate embodiments the locking surfaces 49, 53 may take other forms, such as angled surfaces, and other shapes depending on the given application and/or the configuration of limiting member 42.

Further, for example, limiting member 42 in one embodiment may take the form of an elongated body, such as a pin or a rod of any cross section, positioned within a cavity 111 in middle module layer 16 and movably in contact with one embodiment of a biasing mechanism 112 (also see FIG. 13) that may provide biasing forces to move or resist movement of the elongated body within the module layer. Limiting member 42 includes opposing first and second ends 46, 48 (FIG. 13) that, in a first or neutral position (FIGS. 2, 3 and 14), extend a first predetermined distance 114, 116 (FIG. 14) beyond the top and bottom surfaces 118 (also see FIG. 5), 120 (also see FIG. 9) of middle module layer 16. In one embodiment, first predetermined distances 114, 116 are a sufficient distance for at least a portion of the respective end 46, 48 to extend into the corresponding cavity 108, 110 for engagement by the respective limiting member 40, 44 during actuation of the second or third operational mode of electronic device 12. It should be noted that first predetermined distances 114, 116 may be equal or unequal distances. As such, in this embodiment, this first or neutral position of limiting member 42 is associated with the first operational mode of electronic device 12 and allows relative movement between module layers 14, 16, 19 in either first or second directions 28, 34. Further, limiting member 42 may have a second position (FIGS. 5, 6 and 16) where second end 48 extends a second predetermined distance 122 (FIG. 16) further away from bottom surface 120 than first predetermined distance 116 (FIG. 14) while first end 46 is substantially level with top surface 118. In this embodiment, second predetermined distance 122 is a sufficient distance to cause limiting members 42, 44 to become engageable to substantially prevent relative movement in at least second direction 34 between middle and lower module layers 16, 18 and to allow relative movement of upper module layer 14 in first direction 28. As such, this second position of limiting member 42 corresponds to the second operational mode of electronic device 12. Additionally, limiting member 42 may have a third position (FIGS. 8 and 9) where first end 46 extends a third predetermined distance 124 further away from top surface 110 than first predetermined distance 114 (FIG. 14) while second end 48 is substantially level with bottom surface 112. In this embodiment, third predetermined distance 124 is a sufficient distance to cause limiting members 40, 42 to become engageable to substantially prevent relative movement in at least first direction 28 between upper and middle module layers 14, 16 and to allow relative movement of lower module layer 18 in second direction 34. As such, this third position of limiting member 42 corresponds to the third operational mode of electronic device 12. In this embodiment the movement of limiting member 42 between the first, second and third positions includes a substantially linear movement substantially parallel to a longitudinal axis 126 of limiting member 42. It should be noted, however, that limiting member 42 and/or biasing mechanism 112 and/or middle module layer 16 may be configured to allow other movements, such as rotational movements, non-parallel movements and combinations thereof.

First and second ends 46, 48 of limiting member 42 respectively include at least one displacement surface 43, 45 for transferring a displacement force to or from limiting member 42. In one embodiment, displacement surfaces 43, 45 may be oriented to receive a displacement force from a first direction and transfer the displacement force to limiting member 42, resulting in movement of the limiting member between the first, second and third positions described above. For example, displacement surface 43 may be oriented to face opposite to first direction 28 and displacement surface 45 may be oriented to face opposite to second direction 34 so as to allow relative movement between module layers 14, 16, 18 to change electronic device 12 from the first operational mode to a selected one of the second or third operational modes while locking out actuation of the non-selected mode. Further, in one embodiment referring to FIGS. 2 and 3, displacement surfaces 43, 45 include a planar portion positioned at an oblique angle 128 relative to longitudinal axis 126 of limiting member 42. It should be noted, however, that displacement surfaces 43, 45 may also be positioned obliquely relative to a direction or vector of a received displacement force, or relative to a direction or vector of a desired movement of elongated body 42. As such, in one embodiment, for example, displacement surfaces 43, 45 of limiting member 42 interact with the respective displacement surfaces 41, 47 of limiting members 40, 44 during predetermined relative movement between module layers 14, 16, 18 and thereby define a cam interface that causes a displacement or movement of limiting member 42. This cam interface may have an angle relative to the received force or direction of displacement of about less than about 90 degrees, while in another embodiment the relative angle may range from about 60 degrees to about 10 degrees, and in yet another embodiment the relative angle may range from about 50 degrees to about 20 degrees. Further, it should be noted that displacement surfaces 43, 45 may be oriented in any manner that results in the transfer of forces that cause any type or direction of linear or rotational movement of limiting member 42.

Additionally, locking surface 51 of limiting member 42 may be formed on some portion of, or adjacent to, first and second ends 46, 48. In one embodiment, locking surface 51 may be oriented substantially perpendicular to a direction or vector of a received displacement force so as to substantially resist or prevent movement of limiting member 42. For example, in the embodiment where limiting member 42 is defined by a rod or pin having a circular cross-section, locking surface 51 may include the entire surface area of the rod or pin except for displacement surfaces 43, 45 at each end 46, 48. As such, when properly positioned, locking surface 51 engages the corresponding locking surface 49, 53 of respective limiting member 40, 44 to substantially resist or prevent a transfer of a displacement force that would cause limiting member 42 to move between the first, second and third positions described above, and thereby prevents predetermined relative movements between module layers 14, 16, 18 during actuation of predetermined operational modes.

Suitable materials for forming limiting members 40, 42, 44 include metals, plastics, composites, ceramics, and combinations thereof. Limiting members 40, 42, 44 may be formed integrally with a respective module layer 14, 16, 18 or formed separately and attached. Further, limiting members 40, 42, 44 may be attached via mechanical methods such as via screws, nails, rivets, swaging, sonic welding, etc, as well as via chemical methods such as bonding.

Limiting members 40, 42, 44 may be associated with, and arranged on, each respective module layer 14, 16, 18 in any combination and in any position or configuration that allows actuation of the various operational modes of electronic device 12. For instance, alternate embodiments may include a pin or rod and a biasing mechanism connected to both upper and lower module layers 14, 18 while corresponding separate cavities or one through cavity of is formed in middle module layer 16. Further, the relative position of each limiting member 40, 42, 44 on each module layer 14, 16, 18 may be varied. Additionally, in other embodiments, locking system 10 and/or limiting members 40, 42, 44 may include all or some portion of the locking system and limiting member structure disclosed in U.S. application Ser. No. 10/945,576, entitled "Devices And Methods For Controlling Relative Movement Between Layers Of An Electronic Device," filed Sep. 20, 2004, hereby incorporated by reference.

As mentioned above, referring to FIGS. 13-16, biasing mechanism 112 in one embodiment provides a connection, and allows relative movement, between limiting member 42 and middle module layer 16. Biasing mechanism 112 may be fixedly attached, mechanically or chemically, to one or both of limiting member 42 and middle module layer 16, such as by respectively fitting into a notch or bonding. Alternatively, biasing mechanism 112 may be merely contactable with one or both of limiting member 42 and middle module layer 16, so as to allow at least some degree of independent movement. Biasing mechanism 112 provides at least opposing first and second biasing forces that urge limiting member 42 into the neutral or first position and that respectively oppose movements into the second and third positions, as described above. In this embodiment, biasing mechanism 112 provides biasing forces that substantially act in a direction parallel to longitudinal axis 126 of limiting member 42. Suitable examples of biasing mechanism 112 include a leaf spring, a Belleville washer, a compression spring, an extension spring, a torsion spring, a buckling column, any type of resilient member, mechanical linkages associated with movement of module layers 14, 16, 18, a cam follower mechanism, and other types of mechanisms for causing a force to act upon limiting member 42. One or more biasing mechanisms 112 may be associated with a limiting member, or with more than one limiting member.

Figure 20:
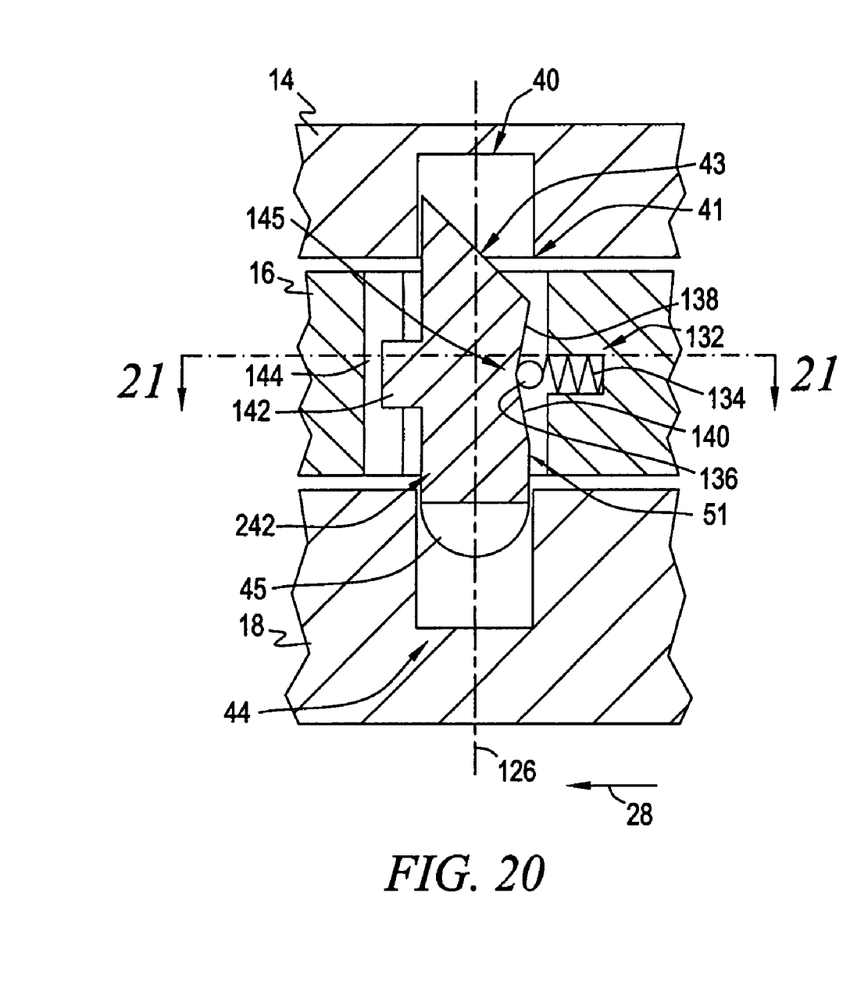
FIG. 20 is a cross-sectional view similar to FIG. 14, but including a different biasing mechanism interacting with a cam surface on the corresponding limiting member.
Figure 21:
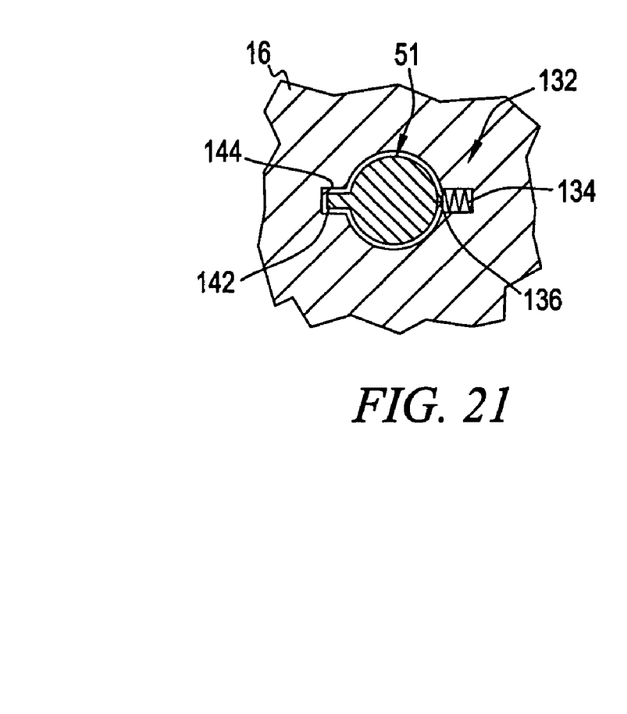
FIG. 21 is a cross-sectional view along line 21-21 of FIG. 20.

In another embodiment, referring to FIGS. 20 and 21, biasing mechanism 132 may be positioned in any orientation relative to a limiting member 242, which is similar to limiting member 42 but with the addition of cam surfaces 138, 140 on its side, to provide a biasing force substantially normal to longitudinal axis 126 of limiting member 242. Such a configuration allows biasing mechanism 132 in combination with cam surfaces 138, 140 to movably retain limiting member 242 in one or more positions relative to middle module layer 16. In one embodiment, referring to FIG. 20, biasing mechanism 132 may further include a cam follower 136, connected to biasing member 134, that interacts with surface 51 of limiting member 242. Surface 51 may include cam surfaces 138, 140 that, through interaction with cam follower 136 and/or biasing member 134, resist movement of limiting member 242 out of, or encourage movement into, a neutral position 145 relative to biasing mechanism 132. In this example, cam surfaces 138, 140 may be linear and/or curved surfaces which may be oriented substantially oblique and/or substantially normal with respect to longitudinal axis 126. For instance, cam surfaces 138, 140 may meet at neutral position 145 and diverge away from one another so as to receive increasing biasing forces from biasing mechanism 132 upon increasing relative movement away from neutral position 145. Further, cam surfaces 138, 140 may extend along surface 51 for a portion or for substantially the entire longitudinal height, and/or exterior surface or circumference, of limiting member 242. As such, the increasing biasing forces caused by the interaction of cam surfaces 138, 140 and biasing mechanism 132 may act on limiting member 242 for a portion or for substantially the entire length of the movement of limiting member 242 to promote movement of limiting member 242 into neutral position 145, or to oppose movement of limiting member 242 toward upper and lower module or component layers 14, 18. Although shown as two surfaces, cam surfaces 138, 140 may include only one surface, such as a curved surface, or more than two surfaces, such as multiple linear surfaces, multiple curved surfaces or combinations of linear and curved surfaces. Additionally, although shown as a v-shaped section turned 90 degrees clockwise, the cam surface or surfaces may form a section of any shape that promotes the ability of limiting member 242 to be movably retained relative to biasing mechanism 132.

Referring additionally to FIG. 21, limiting member 242 may optionally include one or a plurality of guide flanges 142 movably positioned within a corresponding one or plurality of guide channels 144 to form a guide mechanism to orient limiting member 242 within middle module layer 16. For instance, such a guide mechanism substantially prevents rotation of limiting member 242 about longitudinal axis 126, thereby assuring a predetermined alignment of the interacting displacement surfaces 43 and 41, and 45 and 47 (not shown). Further, such a guide mechanism may additionally serve to align cam surfaces 138, 140 with biasing mechanism 132. Guide flanges 142 may include any surface or structure projecting from limiting member 242. Similarly, guide channel 144 may include any surface or structure defining a depression in middle module or component layer 16 that corresponds with guide flange 144. Alternatively, middle module or component layer 16 may be formed with a guide flange, while limiting member may be formed with a guide channel.

As discussed with reference to FIGS. 20 and 21, cam surfaces 138, 140 may form a notch or channel in a portion, or around the circumference or entire external part, of surface 51 of limiting member 242. Alternatively, the limiting member may include a biasing member and the wall structure of the adjacent module or component layer may include the corresponding cam surfaces to produce the desired biasing effect. Further, biasing member 134 may be fixedly or movably connected with or retained within middle module layer 16, such as by mechanical or chemical means. Suitable examples of biasing member 134 include a leaf spring, a Belleville washer, a compression spring, an extension spring, a torsion spring, a buckling column, any type of resilient member, mechanical linkages associated with movement of module layers 14, 16, 18, a cam follower mechanism and other types of mechanisms for causing a force to act upon limiting member 242. Further, cam follower 136 may be fixedly or movably attached to biasing member 134, such as by mechanical or chemical means, or alternatively may be formed integrally with biasing member 134. Cam follower 136 includes any rotating or sliding structure capable of following the cam surfaces and capable of transferring a force between biasing member 134 and limiting member 242. For instance, cam follower 136 may be a ball bearing, a wheel, a curved surface, a pointed surface, etc. As with biasing mechanism 112, it should be noted that one or more biasing mechanisms 132 may be associated with a corresponding limiting member or with more than one limiting member. Further, biasing mechanisms 112 and 132 may be utilized individually or in combination to provide normal and parallel biasing forces acting upon a limiting member. For instance, limiting member 242 of FIG. 20 may have cam surfaces 138, 140 that extend substantially the entire longitudinal length of the limiting member, thereby allowing biasing mechanism 132 to provide biasing forces to bias limiting member 242 into neutral position 145. As such, biasing mechanism 112 may not be necessary depending on the configuration of biasing mechanism 132 and cam surfaces 138, 140.

Figure 17:
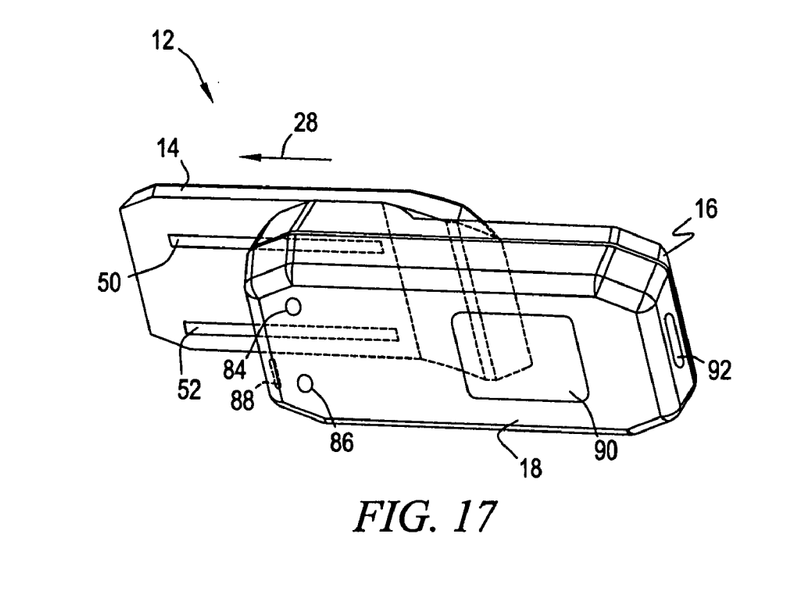
FIG. 17 is a rear perspective view of the electronic device, corresponding to FIG. 4, and one embodiment of a portion of a connection mechanism for allowing relative movement between module layers.
Figure 18:
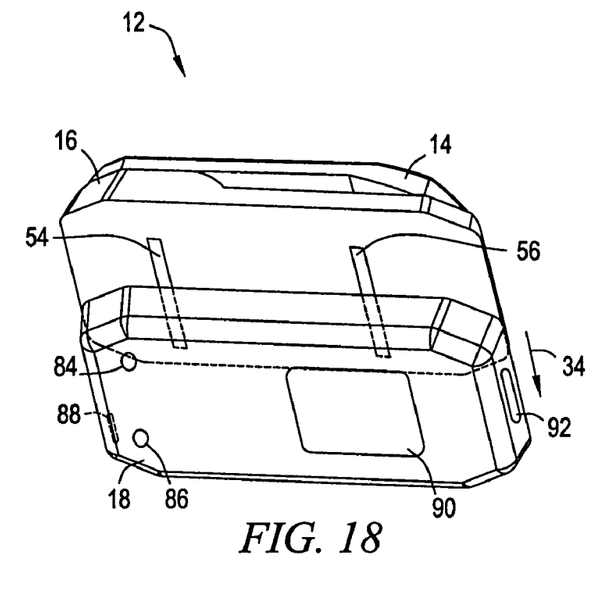
FIG. 18 is a rear perspective view of the electronic device, corresponding to FIG. 7, and one embodiment of a portion of a connection mechanism for allowing relative movement between module layers.
Figure 19:
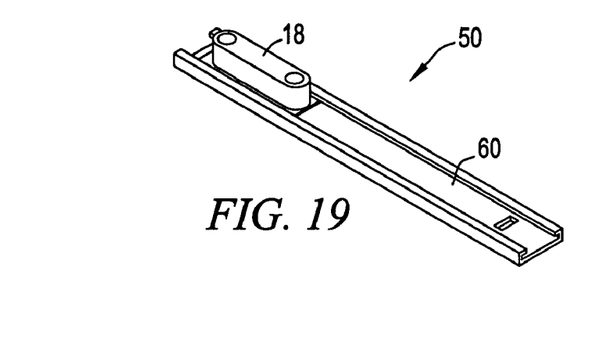
FIG. 19 is a perspective view of one embodiment of the connection mechanism, including a carrier body and a rail member.

Referring to FIGS. 17-19, it should also be noted that connection mechanisms 50, 52, 54, 56 may additionally form a portion of, or at least provide assistance to, locking system 10. One or more connection mechanisms 50, 52, 54, 56 may be utilized to movably connect the module layers 14, 16, 18 such that the various relative movements are achievable. For example, in one embodiment, connection mechanisms 50, 52 movably connect upper and middle module layers 14, 16 for relative movement in at least first direction 28, while connection mechanisms 54, 56 movably connect middle and lower module layers 16, 18 for relative movement in at least second direction 34. In this example, connection mechanisms 54, 56 may aid locking system 10 by preventing relative movement between middle and lower module layers 16, 18 in first direction 28. As such, during movement of upper module layer 14 in first direction 28 to actuate the second operational mode (see FIGS. 5 and 6), limiting member 42 is forced to extend into limiting member 44 such that the side wall or locking surface 53 of cavity 110 may engage locking surface 51 to substantially limit or prevent relative movement of middle and lower module layers 16, 18 in first direction 28 while connection mechanisms 54, 56 also may act to substantially limit or prevent relative movement of middle and lower module layers 16, 18 in first direction 28. As a result, there is a discrete actuation of the second operational mode which provides a user with positive haptic feedback. Whether or not both or one of the limiting members and connection mechanisms act to engage middle and lower module layers 16, 18 and limit their relative movement in first direction 28 during actuation of the second operational mode depends on various factors, such as dimensional characteristics and tolerances. Further, it should be noted that connection mechanisms 54, 56 may not be required limiting member 42 is movably connected to upper module layer 14, thereby effectively providing a movable relationship between middle and lower module layers 16, 18 guided by limiting member 42. Alternatively, connection mechanisms 54, 56 may allow relative movement between middle and lower module layers 16, 18 in any direction if other structures are utilized to guide the relative movement during actuation of the operational modes.

Similarly, connection mechanisms 50, 52 may aid locking system 10 by preventing relative movement between upper and middle module layers 14, 16 in second direction 34. As such, during movement of lower module layer 18 in second direction 34 to actuate the third operational mode (see FIGS. 8 and 9), limiting member 42 is forced to extend into limiting member 40 such that the side wall or locking surface 49 of cavity 108 may engage locking surface 51 (FIGS. 14-16) to substantially limit or prevent relative movement of upper and middle module layers 14, 16 in second direction 34 while connection mechanisms 50, 52 also may substantially limit or prevent relative movement of upper and middle module layers 14, 16 in second direction 34. Again, the result is a discrete actuation of the third operational mode which provides a user with positive haptic feedback. Additionally, it should be noted that connection mechanisms 50, 52 may not be required at all, or may allow relative movement between upper and middle module layers 14, 16 in any direction if other structures are utilized to guide the relative movement.

Connection mechanisms 50, 52, 54, 56 may include various types of magnetic connectors and mechanical connectors. In one embodiment, referring to FIG. 19 for example, connection mechanisms 50 or 52 or 54 or 56 include a carrier body 58 movably connectable to a rail member 60 for movement along the length of the rail member. Carrier body 58 may be fixedly attached to one module layer 14, 16, 18, such as by mechanical or chemical fastening, while rail member 60 may be fixedly attached in a similar manner to the adjacent module layer to provide for the desired relative movement between layers. Referring to FIGS. 17 and 18, rail members associated with connection mechanisms 50, 52 have a length extending parallel to first direction 28, while rail members associated with connection mechanisms 54, 56 have a length extending parallel to second direction 34. As such, each carrier body 58 is movable in both directions along the length of each rail. It should be noted, however, that rail members 60 may be positioned in any orientation relative to one another in order to achieve a desired relative movement for each module layer 14, 16, 18. As such, in this embodiment, the respective rail members and carrier bodies associated with connection mechanisms 50, 52, 54, 56 respectively provide the relative movement of upper and middle module layers 14, 16 to be substantially perpendicular to the relative movement of middle and lower module layers 16, 18. Although connection members 50, 52, 54, 56 are represented as bi-directional sliding connectors, it should be noted that these connection members may provide movement along more than one axis, in more than one plane, and the movement may include linear and/or rotary motion. Further, connection mechanisms 50, 52, 54, 56 may comprise metals, plastics, composites, and ceramics, and they may be formed integrally with each module layer 14, 16, 18 or separately attached via mechanical or chemical methods Referring to FIGS. 4-9, in some embodiments, electronic device 12 may further include protective surfaces 128, 130 respectively positioned on surfaces 100, 102 along respective paths where limiting member 42 may contact the surfaces 100, 102. Protective layers 128, 130 provide the respective module or component layer 14 or 18 with protection against damage caused by contact with limiting member 42. For example, protective surface 128 may lie on upper module layer 14 along a first path parallel to first direction 28, while protective surface 130 may lie on lower module layer 18 along a second path parallel to second direction 34. In one embodiment, protective layers 128, 130 have a surface hardness greater than the surface hardness of the respective module or component layer on which they are located. In another embodiment, protective layers 128, 130 have a coefficient of friction less than a coefficient of friction of the respective module or component layer on which they are located. Suitable examples of materials used to form protective layers 128, 130 include plastics, polymers, elastomers, rubbers, ceramics, metals, etc. Protective layers 128, 130 may be mechanically or chemically bonded to the respective module or component layer 14, 18, or may be integrally formed or molded into the layer. Alternatively, protective layers, or whole end portions, may be formed on the respective limiting members that contact the sliding module or component layers 14, 18.

Although shown as including three layers, electronic device 12 may include any plurality of module layers that each may include one or more sets of functional components associated with one or more operational modes. In this embodiment, the module layers 14, 16, 18 substantially lie in and are movable within parallel planes. It should be noted, however, that their relative motion may also include rotational motion about an axis intersecting one of the planes or linear motion normal to one of the planes. The one or more operational modes enable device 12 to be utilized as one or more of: a mobile, satellite or wireless phone or audio communications device, a gaming device, a personal digital assistant ("PDA"), a pager or text communications device, a global positioning system ("GPS"), a remote control device for controlling another system, an audio player and/or recorder device such as an MP3 player or digital recorder, a static or dynamic video player and/or recorder device, a calculator device, etc. When utilized as a mobile phone, for example, device 12 may include hardware, software and/or firmware for sending and/or receiving communications-related signals using protocols such as a code division multiple access ("CDMA"), wide-band code division multiple access ("WCDMA"), global system for mobile communications ("GSM"), advance mobile phone service ("AMPS") and time division multiple access ("TDMA").

The one or more sets of components associated with each layer of device 12, such as module layers 14, 16, 18, may include one or more of plurality of types of functional components. These sets of components include external components, such as input and output type of mechanisms, and also internal components such as circuit boards and circuit elements such as transistors, chips, firmware, memory, software and processing units configured for one or more operational modes of device 12. For example, as mentioned above, first set of components 20 may include display 22, which includes any type of textual and/or graphical output (and/or input) unit such as an liquid crystal display, a light-emitting diode display, a touch screen, etc. Directional keypads 24, 26 include toggle keys, navigation keys and other individual or multiple function keys associated with controlling movement of a graphic on display 22 or associated with creating an input signal to device 12. First set of components 20 may also include other components such as: an audio speaker 66 (FIG. 10), such as a near-field and/or far-field speaker, for outputting audio signals; one or more indicator lights 68, 70 (FIG. 10) for signaling a status of the device 12; operational keys 72, 74 (FIG. 10) such as an on/off or hang-up key and a call accept/send key; volume keys 76 for increasing or decreasing a volume of a speaker such as near-field speaker 66; a push-to-talk button 78 (FIG. 11) for transmitting a voice signal in a walkie-talkie type phone mode; a record key 80 (FIG. 11) for activation a voice recorder functionality; a speaker/microphone input 82 (FIG. 11) for receiving a remote audio speaker and/or microphone connection mechanism; a camera mechanism 84 (FIGS. 17 and 18) for taking still or video pictures; a test port 86

(FIGS. 17 and 18) for connecting test or monitoring equipment, such as radio frequency ("RF") signaling equipment, to set-up, repair or test electronic device 12; an infra red ("IR") transceiver 88 (FIGS. 17 and 18) for sending and/or receiving data via IR waves; a battery pack 90 (FIGS. 17 and 18) for providing a cordless power source to device 12; a power/data connector 92 (FIGS. 10-12 and 17-18) for establishing a hard-wired connection to a source of power to operate device 12 and/or recharge battery pack 90 and to transmit and/or receive data; and an antenna mechanism 94 (FIG. 10) for transmitting and/or receiving communications signals associated with one or more of the modes of device 12. Similarly, first and second set of additional components 30, 36 may include other functional components, such as any of the above-mentioned components, associated with a desired operational mode. It should be noted that the components associated with device 12 may be arranged in any combination, and on any layer, in order to achieve a desired configuration for each operational mode of device 12.

In operation, for example, the various operational modes of device 12 are controlled by the relative positioning of each layer of device 12. A method of controlling relative movement between these layers includes movably interconnecting various module layers to allow relative movement that exposes various functional components associated with each layer. Further, in order to provide a discrete actuation of an individual operational mode, the device further includes a locking mechanism that prevents movement between predetermined layers during actuation of predetermined modes.

In this embodiment, for example, referring back to FIGS. 1-3 and 10, the first operational mode of electronic device 12 may be achieved by orienting the module layers 14, 16, 18 of electronic device 12 in the first or neutral relative position. In one embodiment, locking system 10 is in a neutral position that allows relative movement of upper module layer 14 in first direction 28 or relative movement of lower module layer 18 in second direction 34. In particular, limiting member 42 is oriented in its first or neutral position with displacement surface 43 facing first direction 28 and extending into cavity 108 of limiting member 40 an amount that overlaps with displacement surface 41. Further, in this orientation of limiting member 42, displacement surface 45 faces second direction 34 and extends into cavity 110 of limiting member 44 an amount that overlaps with displacement surface 47. Additionally, locking surface 51 may be engageable with locking surface 49 to prevent relative motion of upper module layer 14 in second direction 34, and/or connection mechanisms 50, 52 may also prohibit this relative motion. Similarly, locking surface 51 may be engageable with locking surface 53 to prevent relative motion of lower module layer 18 in first direction 28, and/or connection mechanisms 54, 56 may also prohibit this relative motion.

For example, the first operational mode may correspond to one or more of a gaming mode, a PDA mode, a camera mode, a GPS mode, a calculator mode, a data transfer mode and/or a phone stand-by mode. First set of components 20 may be utilized in various combinations to achieve the desired functionality of this mode. For instance, when operated as a gaming device in this first mode, device 12 may be held such that its width is its longest dimension, and directional keypads 24, 26 are utilized for controlling gaming functions. Additionally, associated with the actuation of this mode, device 12 may present the text and/or graphics output from display 22 in a predetermined orientation based on the selected operational mode. So, for example, the text/graphics in the gaming mode may be oriented 90 degrees relative to the text/graphics in a phone or PDA mode. Further, first set of components 20 may simultaneously be functioning in more than one mode, such as in a phone stand-by mode, where upon receiving a phone call an output may be generated, such as by one or more of display 22, indicator lights 68, 70 and speaker 66. A user may change device 12 into a phone mode by then sliding upper module layer 14 in first direction 28 or by accepting the call by depressing call accept key 74. In the PDA mode, a user may view data from display 22 and utilize any of the keys or buttons to produce inputs. Further, display 22 may be a touch screen display that allows additional inputs. In the camera mode, a user may operate camera 84 (FIGS. 4 and 5) to take a still picture or a video, which may also allow the user to record any audio signals received by microphone 32 (FIG. 2) and associated with the picture or video. Further, in the data transfer mode, data may be received by or sent from device 12 through one or more of test port 86 (FIGS. 4 and 5), IR transceiver 88 and power/data connector 92.

A user activates a second operational mode, such as the phone mode (FIG. 4-6, 11 and 14-17), by moving upper module layer 14 in first direction 28 and exposing phone keypad 31. During this actuation step, locking system 10 prevents one or more additional relative movements between the remaining layers that are associated with actuation of additional operational modes. In one embodiment, for example, locking system 10 is in a second position that allows relative movement of upper module layer 14 in first direction 28 and prevents relative movement of lower module layer 18 in second direction 34. In particular, movement of upper module layer 14 in first direction 28 causes displacement surface 41 of limiting member 40 to contact displacement surface 43 of limiting member 42, thereby transferring the displacement force associated with the moving module layer to limiting member 42. This transference of the displacement force causes movement of limiting member 42 along longitudinal axis 126, thereby urging first end 46 out of cavity 108 and second end 48 further into cavity 110. Additionally, by positioning displacement surface 45 entirely within cavity 110, locking surface 51 may be engageable with locking surface 53 to prevent relative motion between middle and lower module layers 16, 18 in a direction perpendicular to the locking surfaces 51, 53.

In this phone mode, hardware, software and/or firmware within device 12 recognize the actuation of this mode and orient the output of display 22 such that it is aligned for use in combination with phone keypad 31. Further, device 12 actuates predetermined internal circuitry associated with the functionality of this mode, such as communications hardware and software for sending and receiving wireless signals. A user may communicate by talking into microphone 32 and by listening to speaker 66. Further, additional phone-related functions may be performed via keystrokes on phone keypad 31 and send key 74, or by using directional keypad 24 or 26. This mode may be turned off, for example, by sliding upper module layer 14 back into the neutral position (FIG. 1) or by depressing the off key 72.

A user activates the third operational mode or pager or two-way text communications mode, referring to FIG. 7-9, 12 and 18, by moving lower module layer 18 in second direction 34 and thereby exposing QWERTY keyboard 38. During this actuation step, locking system 10 prevents additional relative movement between the remaining layers that are associated with actuation of additional operational modes. In one embodiment, for example, locking system 10 is in a third position that allows relative movement of lower module layer 18 in third direction 34 and prevents relative movement of upper module layer 14 in second direction 28. In particular, movement of lower module layer 18 in second direction 34 causes displacement surface 47 of limiting member 44 to contact displacement surface 45 of limiting member 42, thereby transferring the displacement force associated with the moving module layer to limiting member 42. This transference of the displacement force causes movement of limiting member 42 along longitudinal axis 126, thereby urging second end 48 out of cavity 110 and first end 46 further into cavity 108. Additionally, by positioning displacement surface 43 entirely within cavity 108, locking surface 51 may be engageable with locking surface 49 to prevent relative motion between upper and middle module layers 14, 16 in a direction perpendicular to the locking surfaces 49, 51.

In this operational mode, hardware, software and/or firmware within device 12 recognize the actuation of this mode and orient the output of display 22 such that it is aligned for use in combination with QWERTY keyboard 38. Further, device 12 actuates predetermined internal circuitry associated with the functionality of this mode, such as communications hardware and software for sending and receiving wireless signals. A user may communicate, for example, by reading received text messages output by display 22 or by entering characters from keyboard 38 and sending to another device via send key 74. This mode may be turned off, for example, by sliding lower module layer 18 back into the neutral position or by depressing the off key 72.

Thus, the described embodiments provide devices and methods for controlling the actuation of an operational mode of device 12 by allowing certain relative movements between certain module layers while limiting other predetermined relative movements between other module layers. A locking system associated with each module layer is configured to control these various relative movements. While the various disclosed embodiments have been illustrated and described, it will be clear that the subject matter of this document is not limited to these embodiments only. Numerous modifications, changes, variations, substitutions and equivalents will be apparent to those skilled in the art without departing from the spirit and scope of the disclosed embodiments as described in the claims.

What is claimed is:

1. An electronic device, comprising:
    a first component layer movable in a first direction;
    a second component layer movably connected relative to the first component layer; a third component layer movably connected relative to the second component layer and movable in a second direction; and
    a limiting member movable at least between a first position and a second position, the limiting member engageable with the second component layer and the third component layer in the first position to prevent relative movement in the second direction during movement of the first component layer in the first direction.

2. The device of claim 1, wherein the limiting member is further engageable with the second component layer and the first component layer in the second position to prevent relative movement in the first direction during movement of the third component layer in the second direction.

3. The device of claim 2, further comprising a biasing mechanism connectable with the limiting member, the biasing mechanism having at least one of a first biasing force opposing movement of the limiting member into the first position and a second biasing force opposing movement of the limiting member into the second position.

4. The device of claim 3, wherein the biasing mechanism is mountable within the second component layer, wherein the limiting member comprises a first end and an opposing second end and a third position between the first position and the second position, and wherein the first end extends into the first component layer and the second end extends into the third component layer when the limiting member is in the third position.

5. The device of claim 4, wherein the first end comprises a displacement surface enagageable with the first component layer during movement in the first direction.

6. The device of claim 4, wherein the second end comprise a displacement surface engageable with the third component layer during movement in the second direction.

7. The device of claim 4, wherein the first direction is parallel to a first plane, and wherein the first end comprises a first displacement surface facing opposite the first direction and lying in a second plane, wherein a first angle between the second plane and the first plane is less than about 90 degrees.

8. The device of claim 7, wherein the second direction is parallel to the first plane, and wherein the second end comprises a second displacement surface facing opposite the second direction and lying in a third plane, wherein a second angle between the third plane and the first plane is less than about 90 degrees.

9. The device of claim 8, wherein each of the first angle and the second angle is in the range of about 10 degrees to about 60 degrees.

10. The device of claim 8, wherein each of the first angle and the second angle is in the range of about 20 degrees to about 50 degrees.

11. The device of claim 8, wherein the first direction is substantially perpendicular to the second direction.

12. The device of claim 3, wherein the biasing mechanism is selected from the group consisting of a leaf spring, a Belleville washer, a compression spring, an extension spring, a torsion spring, a buckling column, a resilient member, a cam follower mechanism and a mechanical linkage.

13. The device of claim 1, further comprising a first locking surface located on the third component layer and contactable with limiting member by relative movement in the second direction during movement of the first component layer in the first direction.

14. The device of claim 2, further comprising a first locking surface and a second locking surface, the first locking surface located on the third component layer and contactable with limiting member by relative movement in the second direction during movement of the first component layer in the first direction, and the second locking surface located on the first component layer and contactable with the limiting member by relative movement in the first direction during movement of the third component layer in the second direction.

15. The device of claim 14, wherein the first locking surface and the second locking surface each define a wall that encompasses a respective portion of limiting member during the respective movements of the first component layer in the first direction and the second component layer in the second direction to prevent substantially all relative movement between the respective wall and the limiting member.

16. The device of claim 14, wherein the first locking surface includes a first displacement surface obliquely positioned relative to the first direction and wherein the second locking surface includes a second displacement surface obliquely positioned relative to the second direction.

17. The device of claim 16, wherein the first component layer further comprises a first inner surface facing the second component layer, wherein the third component layer further comprises a second inner surface facing the second component layer, wherein the first locking surface and the second locking surface each define a wall that forms an opening in the respective first inner surface and second inner surface, and wherein the first displacement surface and the second displacement surface respectively connect the corresponding wall to the first inner surface and the second inner surface.

18. The device of claim 2, wherein the first component layer comprises a first set of functional components, the second component layer comprises a second set of functional components and the third component layer comprises a third set of functional components, and wherein the device comprises a first operational mode utilizing the first set of functional components, a second operational mode utilizing the second set of functional components and a third operational mode utilizing the third set of functional components, wherein each operational mode is actuated based on a predetermined relative position of the first component layer, the second component layer and the third component layer.

19. The device of claim 18, wherein the first operational mode, the second operational mode and the third operational mode are selected from the group consisting of an audio communication mode, a textual communication mode, a personal digital assistant mode and a gaming mode, a global positioning system ("GPS") mode, a remote control device mode, an audio player or recorder mode, a static or dynamic video player or recorder device, and a calculator mode.

20. The device of claim 18, wherein the second set of functional components are exposable when the first component layer moves relative to the second component layer in the first direction and thereby defines the second operational mode.

21. The device of claim 18, wherein the third set of functional components are exposable when the third component layer moves relative to the second component layer in the second direction and thereby defines the third operational mode.

22. The device of claim 2, further comprising a first connector movably connecting the first component layer and the second component layer.

23. The device of claim 22, wherein the first connector allows at least linear movement substantially parallel to the first direction.

24. The device of claim 22, further comprising a second connector movably connecting the second component layer and the third component layer.

25. The device of claim 24, wherein the second connector allows at least linear movement substantially parallel to the second direction.

26. The device of claim 2, further comprising a communications component having an input and an output respectively for receiving and transmitting a wireless signal.

27. The device of claim 2, further comprising a display for presenting information to a user.

28. The device of claim 27, wherein the information has a first orientation when the first component layer is moved in the first direction relative to the second component layer and a second orientation when the third component layer is moved in the second direction relative to the second component layer.

29. The device of claim 2, wherein the limiting member is contactable with the first component layer along a first path parallel to the first direction and contactable with the third component layer along a second path parallel to the second direction, and further comprising a protective layer on at least one of the first component layer and the second component layer extending respectively along the first path and the second path.

30. The device of claim 29, wherein the protective layer comprises a first surface hardness and wherein a respective one of the first component layer and the second component layer comprises a second surface hardness, wherein the second surface hardness is less than the first surface hardness.

31. The device of claim 29, wherein the protective layer comprises a first coefficient of friction and wherein a respective one of the first component layer and the second component layer comprises a second coefficient of friction, wherein the second surface coefficient of friction is greater than the first coefficient of friction.

32. The device of claim 1, wherein the limiting member is movably fixed within the second component layer, wherein the second component layer further comprises a first outer surface facing the first component layer and a second outer surface facing the third component layer, wherein the limiting member further comprises an elongated body having a first end opposing a second end, wherein in the second position the first end extends a first distance into the first component layer and the second end extends a second distance into the third component layer, wherein in the first position the first end extends at most to an outer surface of the first component layer and the second end extends a third distance into the third component layer, wherein the third distance is greater than the second distance.

33. The device of claim 32, further comprising a biasing mechanism connectable with the limiting member, the biasing mechanism having a first biasing force opposing movement of the limiting member into the first position.

34. The device of claim 1, wherein the first direction and the second direction are parallel to a first plane, and wherein the limiting member is movable between the first position and the second position along an axis that intersects the first plane.

35. The device of claim 34, further comprising a biasing mechanism connectable with the limiting member, the biasing mechanism having a first biasing force opposing movement of the limiting member into the first position.

36. The device of claim 1, further comprising a biasing mechanism that provides a biasing force substantially normal to the first direction.

37. The device of claim 36, wherein the limiting member further comprises at least one cam surface contactable with the biasing mechanism to effect movement of the limiting member between the first position and the second position.

38. The device of claim 37, wherein the at least one cam surface comprises at least one of a linear surface and a curved surface.

39. The device of claim 37, wherein the at least one cam surface comprises an oblique surface relative to the first direction.

40. The device of claim 1, further comprising a guide mechanism connectable with the limiting member, wherein the guide mechanism orients the limiting member relative to the second component layer.

41. The device of claim 1, further comprising a first biasing mechanism and a second biasing mechanism contactable with the limiting member, the first biasing member having a first biasing force acting substantially parallel to the first direction and the second biasing mechanism having a second biasing force acting substantially perpendicular to the first direction.

42. An electronic device, comprising:
a first component layer movable in a first direction and having a first limiting member;
a second component layer movably connected relative to the first component layer;
a third component layer movably connected relative to the second component layer and movable in a second direction; and
a second limiting member movably connected to the second component layer and having a first displacement surface at a first end, the second limiting member movable between a first position and a second position, wherein the first limiting member is contactable with the first displacement surface during at least a portion of a movement of the first component layer in the first direction to move the second limiting member into the first position, wherein the second limiting member is engageable with the third component layer to substantially prevent relative movement in the second direction.

43. The device of claim 42, wherein the third component layer further comprises a third limiting member, wherein the second limiting member further includes a second displacement surface at a second end opposing the first end, and wherein the third limiting member is contactable with the second displacement surface during at least a portion of a movement of the third component layer in the second direction to move the second limiting member into the second position, wherein the second limiting member is engageable with the first component layer to substantially prevent relative movement in the first direction.

44. The device of claim 43, wherein the first displacement surface forms an oblique angle relative to the first direction and the second displacement surface forms an oblique angle relative to the second direction.

45. The device of claim 44, further comprising a biasing mechanism having a first biasing force that opposes movement of the second limiting member into the first position and a second biasing force that opposes movement of the second limiting member into the second position.

46. An electronic device, comprising:
a first component layer movable in a first direction;
a second component layer movably connected relative to the first component layer;
a third component layer movably connected relative to the second component layer and movable in a second direction; and
a movably connected means for substantially preventing relative movement between the second component layer and the third component layer during movement of the first component layer in the first direction and between the second component layer and the first component layer in the second direction during movement of the third component layer in the second direction.

47. The device of claim 46, further comprising a biasing means for subjecting biasing forces to the movably connected means for substantially preventing relative movement during at least one of the movement of the first component layer in the first direction and the movement of the third component layer in the second direction.

48. The device of claim 46, further comprising a means for transferring a movement of at least one of the first component layer in the first direction and the third component layer in the second direction into displacing movement of the movably connected means for substantially preventing relative movement into a position between one of the second component layer and the third component layer, and the second component layer and the first component layer.

49. The device of claim 48, wherein the movably connected means for substantially preventing relative movement further comprises a limiting member movable between a first position engageable with the second component layer and the third component layer during movement of the first component layer in the first direction and a second position engageable with the first component layer and the second component layer during movement of the third component layer in the second direction.

50. The device of claim 49, wherein the means for transferring a movement further comprises a first displacement surface on a first end of the limiting member and a second displacement surface on an opposing second end of the limiting member, wherein the first displacement surface forms a first oblique angle relative to the first direction and the second displacement surface forms a second oblique angle relative to the second direction.

51. A method of controlling relative movement between movable layers of an electronic device, comprising:
movably connecting a first module layer to a second module layer having a first functional component such that a relative movement of the first module layer in a first direction exposes the first functional component;
movably connecting the second module layer to a third module layer having a second functional component such that a relative movement of the third module layer in a second direction exposes the second functional component; and
movably positioning a first limiting member to prevent movement of the third module layer in the second direction during movement of the first module layer in the first direction.

52. The method of claim 51, where movably positioning the first limiting member further comprises preventing movement of the first module layer in the first direction during movement of the third module layer in the second direction.

53. The method of claim 52, where movably positioning the first limiting member to prevent movement of the third module layer in the second direction during movement of the first module layer in the first direction further comprises movably contacting the first limiting member with a second limiting member, where the first limiting member is connectable with a first selected one of the first module layer, the second module layer and the third module layer, and where the second limiting member is located on a second selected one of the first module layer, the second module layer and the third module layer.

54. The method of claim 53, where movably positioning the first limiting member to prevent movement of the first module layer in the first direction during movement of the third module layer in the second direction further comprises movably contacting the first limiting member with a third limiting member, where the third limiting member is located on at least a last selected one of the first module layer, the second module layer and the third module layer.

55. The method of claim 54, where the first limiting member comprises an elongated member and where the second limiting member and the third limiting member each comprise at least one internal wall that defines a cavity in an external surface of a respective module layer.

56. The method of claim 51, where movably positioning the first limiting member to prevent movement of the third module layer in the second direction during movement of the first module layer in the first direction further comprises movably contacting a first displacement portion of the first limiting member with a second displacement portion of a second limiting member, where the first limiting member is connectable with the second module layer and where the second limiting member is located on the first module layer.

57. The method of claim 56, further comprising displacing a first locking portion of the first limiting member into a contactable position with a second locking portion of a third limiting member located on the third module layer.

58. The method of claim 57, further comprising biasing the first limiting member to oppose the displacing into the contactable position.

59. The method of claim 56, where at least the first displacement portion is oriented to face the first direction.

60. The method of claim 52, where movably positioning the first limiting member to prevent movement of the first module layer in the first direction during movement of the third module layer in the second direction further comprises movably contacting a first displacement portion of the first limiting member with a second displacement portion of a second limiting member, where the first limiting member is connectable with the second module layer, and where the second limiting member is located on the third module layer.

61. The method of claim 60, further comprising displacing a first locking portion of the first limiting member into a contactable position with a second locking portion of a third limiting member located on the first module layer.

62. The method of claim 61, further comprising biasing the first limiting member to oppose the displacing into the contactable position.

63. The method of claim 60, where at least the first displacement portion is oriented to face the second direction.

64. The method of claim 52, further comprising outputting information on a display in a first orientation when the first input mechanism is exposed and in a second orientation when the second input mechanism is exposed, where the display is located on one of the first module layer, the second module layer and the third module layer.

65. A method for controlling actuation of operational modes of an electronic device, comprising:
    a step for exposing a first set of functional components on a second module layer movably connected to a first module layer, where the first set of functional components is associated with a first operational mode of the electronic device;
    a step for exposing a second set of functional components on a third module layer movably connected to the second module layer, where the second set of functional components is associated with a second operational mode of the electronic device; and
    a step for movably positioning a limiting member to prevent exposure of one of the first set of functional components and the second set of functional components during exposure of the other one of the first set of functional components and the second set of functional components.

66. The method of claim 65, further comprising a step for displaying information in a predetermined orientation depending on an operational mode of the electronic device.

* * * * *